United States Patent

Iwasaki et al.

[11] Patent Number: 5,985,477
[45] Date of Patent: Nov. 16, 1999

[54] POLYMER ELECTROLYTE FOR FUEL CELL

[75] Inventors: Katsuhiko Iwasaki, Ehime; Taketsugu Yamamoto, Ibaraki; Hiroshi Harada, Ehime; Atsushi Terahara, Ibaraki; Kunihisa Satoh, Ehime, all of Japan

[73] Assignee: Sumitomo Chemical Company, Limited, Osaka, Japan

[21] Appl. No.: 08/997,564

[22] Filed: Dec. 23, 1997

[51] Int. Cl.$^6$ .................................................. H01M 8/10
[52] U.S. Cl. ............................................. 429/33; 528/171
[58] Field of Search ........................... 528/171; 525/534; 429/33

[56] References Cited

U.S. PATENT DOCUMENTS

| | | | |
|---|---|---|---|
| 4,273,903 | 6/1981 | Rose | 525/534 |
| 5,271,813 | 12/1993 | Linkous . | |
| 5,403,675 | 4/1995 | Ogata | 429/33 |
| 5,693,740 | 12/1997 | Colquhoun | 528/171 |

FOREIGN PATENT DOCUMENTS

| | | |
|---|---|---|
| 0 029 633 | 6/1981 | European Pat. Off. . |
| 60-255109 | 5/1986 | Japan . |
| 10 021 943 | 1/1998 | Japan . |
| WO 96 29752 | 9/1996 | WIPO . |

OTHER PUBLICATIONS

Linkous et al., *Polymeric Material Science and Engineering*, Characteristics Of Sulfonic Acids Of High Temperature Polymers As Membranes For Water Electrolysis, 68, pp. 122–123 (1993) month N/A.

*Primary Examiner*—Maria Nuzzolillo
*Assistant Examiner*—Monique M. Wills
*Attorney, Agent, or Firm*—Birch, Stewart, Kolasch & Birch, LLP

[57] ABSTRACT

Provided is a polymer electrolyte which is cheap and easily synthesized, and has a high water resistance and high output performance.

The polymer electrolyte comprising a sulfonated polymer having an ion-exchange group equivalent weight of 500 to 2500 g/mol, which is obtainable by sulfonating a structural unit represented by the structural formula (II) of a copolymer having 95 to 40 mol % of a structural unit represented by the following structural formula (I) and 5 to 60 mol % of a structural unit represented by the following structural formula (II), 7 Claims, 1 Drawing Sheet

POLYMER ELECTROLYTE FOR FUEL CELL

BACKGROUND OF THE INVENTION

1. Field of the Invention

The present invention relates to a polymer electrolyte for a fuel cell, a method for producing them, and a fuel cell.

2. Description of the Related Art

Due to the recent attention to various environmental problems, a new energy technique has thus attracted special interests. It is such a fuel cell technique which is considered a promising new energy technique and it is anticipated that it will become one of the most important technologies in the future. A polymer type fuel cell using a proton-conductive polymer as an electrolyte has attracted such special interest because of features such as good operation property at low temperatures, possibility of miniaturization, creating light, etc.

An example of a polymer electrolyte for a polymer type fuel cell, is Nafion (trademark of Du Pont Co.) which has ultrastrong acid groups containing fluorinated polymer. However, Nafion is very expensive because it is a fluorinated polymer, and control of water must be strictly followed because of its low water retention in the case of using it as a fuel cell. Furthermore, it is necessary when using a fluorine containing compound to take the environment into consideration with respect to synthesis and disposal. Therefore, a polymer electrolyte of a non-fluorinated proton-conductive material is desirable by today's market standard.

Some studies have already been made with respect to the non-fluorinated polymer-based proton-conductive polymer. For example, a fuel cell using a sulfonated aromatic polyether ether ketone as the electrolyte has been researched. A detailed report on the synthesis of the sulfonated aromatic polyether ether ketone and its characteristics are disclosed in Polymer, 1987, Vol. 28, 1009. This report discloses that an aromatic polyether ether ketone, which is insoluble in organic solvent, becomes soluble in an organic solvent by highly sulfonating it, thereby facilitating film formation. The hydrophilic nature of these sulfonated aromatic polyether ketone has increased thus the water-solubility or a reduction in strength on water absorption occurred. When the water-solubility occurs, a fuel cell normally forms water as a by-product as a result of a reaction between fuel and oxygen, the sulfonated aromatic polyether ketone is therefore not suitable to use as an electrolyte for a fuel cell. The Japanese Patent Kokai Publication No. 6-93114, with respect to an electrolyte of a sulfonated aromatic polyether ether ketone, shows that the inventors succeeded in the production of an electrolyte having excellent strength through a process of introducing a crosslinkable functional group at the time of polymer synthesis and crosslinking this functional group after film formation.

Polymeric Material Science and Engineering, 68, 122–123 (1993) and U.S. Pat. No. 5,271,813 disclose that sulfonated compounds of polymers (e.g. sulfonated aromatic polyether ether ketone, sulfonated aromatic polyether sulfone, etc.) can be utilized as an electrolyte of a device for electrolysis of water (UDEL P-1700 used as polyether sulfone is a polymer classified as polysulfone (PSF)). However, there is no description about various physical properties such as primary structure or ion-exchange group equivalent weight of these sulfonated compounds of polymers, and it is difficult for the resulting sulfonated polysulfone not to dissolve in water due to its high water absorption.

These conventional techniques have problems such as an expensive electrolyte, insufficient strength, difficult synthesis of a polymer material, etc.

SUMMARY OF THE INVENTION

An object of the present invention is to provide a polymer electrolyte for fuel cell, which is cheap and is easily synthesized with a high water resistance and a high performance. That is, the present invention provides a polymer electrolyte for a fuel cell, comprising a sulfonated polymer having an ion-exchange group equivalent weight of 500 to 2500 g/mol, which is obtainable by sulfonating a structural unit represented by the structural formula (II) of a copolymer having 95 to 40 mol % of a structural unit represented by the following structural formula (I) and 5 to 60 mol % of a structural unit represented by the following structural formula (II); a polymer electrolyte membrane for a fuel cell, comprising the polymer electrolyte for a fuel cell; and a fuel cell using the polymer electrolyte membrane for fuel cell,

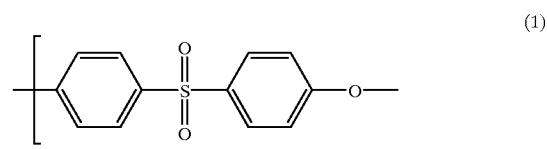

(1)

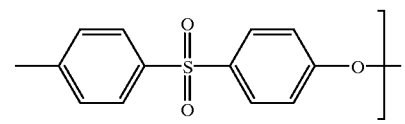

(II)

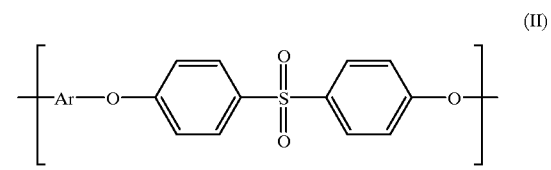

wherein Ar represents at least one of the following structures,

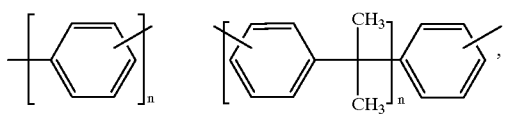

(n = 1, 2, 3)    (n = 1, 2)

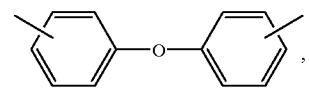

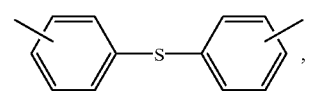

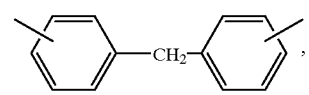

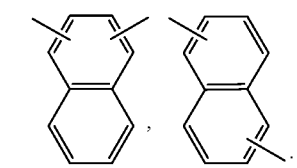

DETAILED DESCRIPTION OF THE INVENTION

Figure 1:
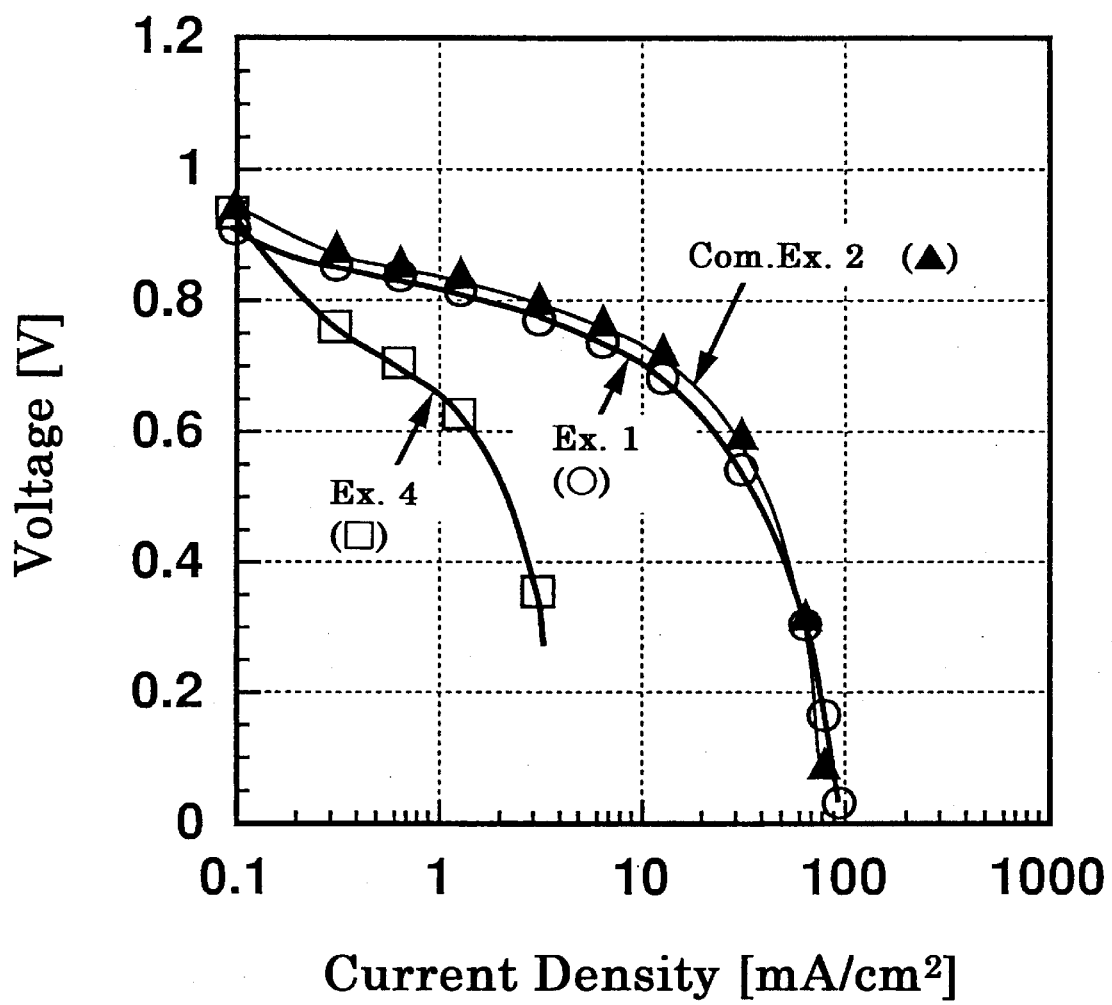
FIG. 1 is a plot of current density versus voltage illustrating a fuel cell output performance in Examples and Comparative Example.

The present invention will be described in detail hereinafter.

The polymer electrolyte for a fuel cell of the present invention comprises a sulfonated polymer having an ion-exchange group equivalent weight of 500 to 2500 g/mol, which is obtainable by sulfonating a structural unit represented only by the structural formula (II) of a copolymer having 95 to 40 mol % of a structural unit represented by the above structural formula (I) and 5 to 60 mol % of a structural unit represented by the above structural formula (II).

In the structural unit represented by the structural formula (II) in the polyether sulfone copolymer, Ar is a divalent aromatic group, and preferably has the following structure.

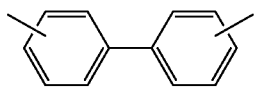

As a method of synthesizing the polyether sulfone copolymer, for example, a method described in Japanese Patent Kokoku Publication No. 62-28169 is known. A molecular weight of the polymer is not specifically limited, but a weight-average molecular weight is preferably from 5,000 to 200,000, more preferably from 10,000 to 100,000. When the molecular weight is smaller than 5,000, the strength of the film obtained after film formation may be decreased. On the other hand, when the molecular weight is larger than 200,000, it sometimes becomes difficult to perform molding processing.

As a method of sulfonating the polyether sulfone copolymer, i.e. method of introducing a sulfonic acid group into a polymer, for example, methods described in Japanese Patent Kokoku Publication Nos. 61-36781, 2-17571 and 1-54323 are known. In Japanese Patent Kokoku Publication No. 61-36781, there is described a method of sulfonating a copolymer having a structural unit represented by the above structural formula (I) and a structural unit represented by the following structural formula (III) with concentrated sulfuric acid. Specifically, it is described that the structural unit represented only by the following structural formula (III) can be selectively sulfonated by dissolving the copolymer in concentrated sulfuric acid and stirring at room temperature for several hours.

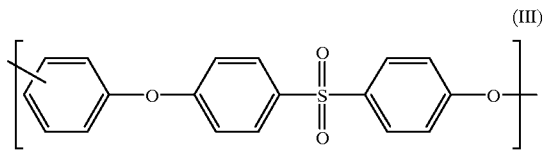

(III)

A sulfonating agent used for sulfonating the polyether sulfone copolymer of the present invention is not specifically limited, but concentrated sulfuric acid capable of sulfonating the structural unit represented only by the above structural unit (II) selectively and quantitatively, is preferable.

The polymer electrolyte for a fuel cell of the present invention comprises a sulfonated polymer having an ion-exchange group equivalent weight of 500 to 2500 g/mol, which is obtainable by sulfonating the structural unit represented only by the above structural formula (II) of the polyether sulfone copolymer. The ion-exchange group equivalent weight is preferably from 550 to 1500 g/mol, more preferably from 600 to 1000 g/mol. When the ion-exchange group equivalent weight exceeds 2500 g/mol, the output performance is decreased. On the other hand, when the ion-exchange group equivalent weight is lower than 500 g/mol, the water resistance of the copolymer is decreased.

The term "ion-exchange group equivalent weight" used herein means a molecular weight of the sulfonated polymer per mol of sulfonic acid groups introduced, i.e. amount of sulfonic acid groups introduced. The ion-exchange group equivalent weight can be measured, for example, by an acid base titration method described in Japanese Patent Kokoku Publication No. 1-52866.

As a method of controlling the ion-exchange group equivalent weight of the sulfonated polyether sulfone copolymer in the range from 500 to 2500 g/mol, a method of controlling a copolymerization ratio of the structural unit represented by the structural formula (I) to the structural unit represented by the structural formula (II) of the polyether sulfone copolymer can be used.

In case of sulfonating the polyether sulfone copolymer, a sulfonic acid group (—$SO_3H$) is substantially introduced only into an aromatic ring which is not adjacent to a sulfone group (—$SO_2$—) in the structural unit represented by the above structural formula (II), i.e. the unit represented by Ar. The number of sulfonic acid groups to be introduced is at most one per one aromatic ring when the bond position in the polymer backbone chain of the aromatic ring is ortho- or para-position. When the aromatic ring is bonded in the polymer backbone chain at the meta-position, the number of sulfonic acid groups is at most two per one aromatic ring. Therefore, sulfonated polymer having different sulfonation degree (ion-exchange group equivalent weight) can be obtained from polymers having the same molecular weight according to the bond position of the aromatic ring in the polymer backbone chain.

That is, in the present invention, when the ion-exchange group equivalent weight of the desired sulfonated polymer is decided, the desired sulfonated polymer can be obtained by selecting or synthesizing the polyether sulfone copolymer having the specific bond position of the Ar in the polymer backbone chain unit and quantitatively sulfonating the copolymer.

When a polymer electrolyte is used for a fuel cell, it is normally used in the form of a film. A method of converting the sulfonated polymer into a film is not specifically limited, but a method of forming a film from a solution state (solution casting method) or a method of forming a film from a molten state (melt pressing method or melt extrusion method) can be used. In case of the former, for example, a film is formed by casting and applying a N,N-dimethylformamide solution of a polymer on a glass plate, and removing the solvent. The solvent used for forming a film may be any one which can dissolves the polymer and is removed after coating. For example, there can be suitably used aprotic polar solvents such as N,N-dimethylformamide, N,N-dimethylacetamide, N-methyl-2-pyrrolidone, dimethyl sulfoxide, etc.; or alkylene glycol monoalkyl ethers such as ethylene glycol monomethyl ether, ethylene glycol monoethyl ether, propylene glycol monomethyl ether, propylene glycol monoethyl ether, etc.

A thickness of the film is not specifically limited, but is preferably from 10 to 200 μm. In order to obtain the film strength enough for practical use, the thickness is preferably thicker than 10 μm. In order to reduce the film resistance, i.e., improvement in output performance, the thickness is preferably thiner than 200 μm. The film thickness can be controlled by the solution concentration or thickness of coating onto the substrate. In the case of forming a film from a molten state, a melt pressing method or a melt extrusion method can be used.

In the case of producing the electrolyte of the present invention, there can be used additives such as plasticizers, stabilizers, releasants, etc., as far as the object of the present invention is not adversely affected.

A method of bonding the electrolyte to an electrode in case of using for a fuel cell is not specifically limited, and a known method (e.g. chemical plating method described in Denki Kagaku, 1985, 53, 269, thermal press method of a gas diffusion electrode described in Electrochemical Science and Technology, 1988, 135 (9), 2209, etc.) can be applied.

EXAMPLES

The following Examples further illustrate the present invention in detail but are not to be construed to limit the scope thereof. The measuring conditions of the respective physical properties are as follows.

(1) Ion-exchange group equivalent weight

After precisely weighing (a (g)) a sulfonated polymer to be measured in a closable glass container, an excess amount of an aqueous calcium chloride solution is added therein, followed by stirring overnight. Hydrogen chloride generated in the system is titrated (b (ml)) with an aqueous 0.1 N standard sodium hydroxide solution (potency: f) using phenolphthalein as an indicator. An ion-exchange group equivalent weight (g/mol) is determined from the above measured value according to the following equation.

$$\text{Ion-exchange group equivalent weight} = (1000 \times a)/(0.1 \times b \times f)$$

(2) Output performance of a fuel cell

An electrolyte bonded with an electrode was incorporated into a cell to be evaluated, and the output performance of a fuel cell was evaluated. As a reaction gas, hydrogen/oxygen was used. After moistening by passing through a water bubbler at 23° C. under a pressure of 1 atm, the reaction gas was fed to the cell to be evaluated. A flow rate of hydrogen and that of oxygen were adjusted to 60 ml/min. and 40 ml/min., respectively. A cell temperature was adjusted to 23° C. The output performance of the cell was evaluated by using a charge/discharge test unit (H201B, manufactured by Hokuto Denko Co., Ltd.).

Example 1

(1) Production of a polyether sulfone copolymer

A polyether sulfone copolymer using 4,4'-dihydroxydiphenyl sulfone, 4,4'-dihydroxybiphenyl and 4,4'-dichlorodiphenyl sulfone as a monomer was prepared by reacting 4,4'-dihydroxydiphenyl sulfone, 4,4'-dihydroxybiphenyl and 4,4'-dichlorodiphenyl sulfone in a ratio of 6:4:10 in the presence of potassium carbonate, using diphenyl sulfone as a polymerization solvent. The polymerization temperature was in the range from 200 to 290° C. Both of the diols and the dihalide as substantially equimolar components were used, together with a two-fold excess molar equivalent of potassium carbonate to the molar equivalent of dihalide. It was confirmed by $^1$H-NMR that a copolymer having a composition ratio corresponding to the charged raw materials, wherein the ratio of the structural unit represented by the above structural formula (I) to that represented by the above structural formula (II) is 6:4, is obtained. A reduced viscosity of the resulting polymer in 1% N,N-dimethylformamide solution at 25° C. was 0.38, and weight-average molecular weight (in terms of polystyrene) of the resulting polymer determined by gel permeation chromatography (GPC) was 55,000.

(2) Sulfonation of polyether sulfone copolymer

The polyether sulfone copolymer (25 g) obtained in the above item (1) and concentrated sulfuric acid (125 ml) were charged in a 500 ml round bottom flask equipped with a thermometer, a nitrogen introducing tube, a dropping funnel and a stirrer, and then the polymer was sulfonated by stirring at room temperature under a nitrogen flow overnight. The sulfonated polyether sulfone was precipitated by slowly adding the reaction solution to 3 liter of deionized water, filtered and then recovered. A deionized water-washing operation using a mixer and a recovering operation using a suction filter were repeated until the wash becomes neutral, and then the polymer was dried under reduced pressure at 80° C. overnight.

The ion-exchange group equivalent weight of the resulting sulfonated polyether sulfone was 660g/mol. It was confirmed by the results of the titration of the polymer after sulfonation and measurement of $^1$H-NMR that the sulfonic acid group is introduced into only a 4,4'-dihydroxybiphenyl unit in the polymer backbone chain, selectively and quantitatively.

(3) Evaluation of a fuel cell

The sulfonated polyether sulfone copolymer obtained in the above item (2) dissolved in N-methyl-2-pyrrolidone was casted and applied on a glass substrate, dried under reduced pressure while slowly decreasing pressure at 80° C., followed by heating to 150° C. and further drying under reduced pressure for 3 hours to completely remove the solvent. The resulting film was a pale brown transparent flexible film and had a thickness of 140 μm. The film was punched out to form a circle having a diameter of 30 mm ø and a gas diffusion electrode was thermally press-bonded, and the resultant was used for evaluation of a fuel cell. As the gas diffusion electrode, a Pt-supporting (0.35 mg/cm$^2$) electrode manufactured by E-TEK U.S.A. Inc. was used. The punched gas diffusion electrode having a diameter of 20 mm ø was uniformly impregnated with 0.1 ml of a 5 wt % Nafion solution (lower alcohol/water mixed solvent, manufactured by Aldrich U.S.A. Inc.) as a binder and then dried under reduced pressure at 80° C. for 2 hours to remove the solvent. The electrode was immersed in boiling deionized water for 2 hours, together with the electrolyte film, thereby to let the binder portion absorb water. They were taken out from water and, after removing water adsorbed on the surface, the electrolyte film was interposed between two electrodes so that the catalyst surface of the electrode faces the electrolyte side, followed by pressing at 80° C. under 80 kgf/cm$^2$ for 90 seconds to obtain an electrode-bonded membrane. The resulting electrode-bonded membrane was incorporated into the cell to be evaluated and the output performance of the fuel cell was evaluated. The resulting plot of current density versus voltage is shown in FIG. 1.

Example 2

(1) Evaluation of fuel cell

A film of the sulfonated polyether sulfone copolymer obtained in Example 1(2) was formed by using a thermal press molding device. The polymer powder (0.5 g) and an aluminum spacer having a width of 0.2 mm and an inner diameter of 30 mm ø were interposed between two Teflon sheets having a thickness of 0.2 mm and, furthermore, the resultant laminate was interposed between two steel plates having a thickness of 3 mm. After heating at 280° C. under 5 kgf/cm$^2$ for 3 minutes and thermal press molding at 280° C. under 200 kgf/cm$^2$ for 2 minutes, a film having a thickness of 200 μm was obtained. According to the same manner as that described in Example 1(3), an electrode was bonded and the output performance of the cell was evaluated. As a result, the cell showed the same output performance as that of Example 1.

Example 3

(1) Production of polyether sulfone copolymer

According to the same manner as that described in Example 1 except for changing the ratio of 4,4'-dihydroxydiphenyl sulfone, 4,4'-dihydroxybiphenyl and 4,4'-dichlorodiphenyl sulfone to 7:3:10, a polyether sulfone copolymer was prepared. It was confirmed by $^1$H-NMR that a copolymer having a composition ratio corresponding to the charged raw material, wherein the ratio of the structural unit represented by the above structural formula (I) to that represented by the above structural formula (II) is 7:3, is obtained. A reduced viscosity of the resulting polymer in a 1% N,N-dimethylformamide solution at 25° C. was 0.39, and a weight-average molecular weight (in terms of polystyrene) of the resulting polymer determined by GPC was 57,000.

(2) Sulfonation of polyether sulfone copolymer

According to the same manner as that described in Example 1(2), the polyether sulfone copolymer obtained in the above item (1) was sulfonated to obtain a sulfonated polyether sulfone having an ion-exchange group equivalent weight of 860 g/mol. It was confirmed by the results of the titration of the polymer after sulfonation and measurement of $^1$H-NMR that the sulfonic acid group is introduced into only a 4,4'-dihydroxybiphenyl unit in the polymer backbone chain, selectively and quantitatively.

(3) Evaluation of fuel cell

According to the same manner as that described in Example 1 (3), a film of the polymer was formed (pale brown transparent, 120 μm in thickness) and, after bonding a gas diffusion electrode, the output performance of fuel cell was evaluated. As a result, the cell was operated as the fuel cell in the same manner as in Examples 1 and 2. A potential of the cell was 0.7 V at a current density of 10 mA/cm$^2$.

Example 4

(1) Production of polyether sulfone copolymer

According to the same manner as that described in Example 1 except for changing the ratio of 4,4'-dihydroxydiphenyl sulfone, 4,4'-dihydroxybiphenyl and 4,4'-dichlorodiphenyl sulfone to 9:1:10, a polyether sulfone copolymer was prepared. It was confirmed by $^1$H-NMR that a copolymer having a composition ratio corresponding to the charged raw material, wherein the ratio of the structural unit represented by the above structural formula (I) to that represented by the above structural formula (II) is 9:1, is obtained. A reduced viscosity of the resulting polymer in 1% N,N-dimethylformamide solution at 25° C. was 0.38, and weight-average molecular weight (in terms of polystyrene) of the resulting polymer determined by GPC was 54,000.

(2) Sulfonation of polyether sulfone copolymer

According to the same manner as that described in Example 1(2), the polyether sulfone copolymer obtained in the above item (1) was sulfonated to obtain a sulfonated polyether sulfone having an ion-exchange group equivalent weight of 2500 g/mol.

(3) Evaluation of fuel cell

According to the same manner as that described in Example 1 (3), a film of the polymer was formed (pale brown transparent, 100 μm in thickness) and, after bonding a gas diffusion electrode, the output performance of fuel cell was evaluated. The resulting plot of current density versus voltage is shown in FIG. 1. As a result, the cell was operated as the fuel cell.

Comparative Example 1

(1) Production of polyether sulfone copolymer

According to the same manner as that described in Example 1 except for changing the ratio of 4,4'-dihydroxydiphenyl sulfone, 4,4'-dihydroxybiphenyl and 4,4'-dichlorodiphenyl sulfone to 3:7:10, a polyether sulfone copolymer was prepared. It was confirmed by $^1$H-NMR that a copolymer having a composition ratio corresponding to the charged raw material, wherein the ratio of the structural unit represented by the above structural formula (I) to that represented by the above structural formula (II) is 3:7, is obtained. A reduced viscosity of the resulting polymer in 1% N,N-dimethylformamide solution at 25° C. was 0.37, and weight-average molecular weight (in terms of polystyrene) of the resulting polymer determined by GPC was 52,000.

(2) Sulfonation of polyether sulfone copolymer

According to the same manner as that described in Example 1(2), the polyether sulfone copolymer obtained in the above item (1) was sulfonated. As a result, a polymer which is insoluble in water could not be obtained. An ion-exchange group equivalent weight calculated on the assumption that only the structural unit represented by the above structural formula (I) is sulfonated was 400 g/mol.

Comparative Example 2

Using a Nafion 117 film (film thickness: 180 μm) as the electrolyte film, the output performance of the fuel cell was evaluated. The Nafion film was punched out to form a cycle having a diameter of 30 mm ø, immersed in aqueous 5% hydrogen peroxide at 100° C. for 30 minutes and 5% dilute sulfuric acid at 100° C. for 30 minutes, and then sufficiently washed with deionized water at 100° C. According to the same manner as that described in Example 1(3), a gas diffusion electrode was bonded to the film after washing and the output performance of the cell was evaluated. The resulting plot of current density versus voltage is shown in FIG. 1.

Comparative Example 3

(1) Sulfonation of polyether sulfone homopolymer

A sulfonated compound of the polyether sulfone composed only of the structural unit represented by the above structural formula (I) was synthesized and the evaluation as the polymer electrolyte for fuel cell was performed as follows. Polyether sulfone Sumika Excel PES5200P (reduced viscosity of 1% N,N-dimethylformamide solution at 25° C.=0.52) was dried under reduced pressure overnight. Dried polyester sulfone (25 g) and 125 ml of concentrated sulfuric acid were charged in a 500 ml round bottom flask equipped with a thermometer, a nitrogen introducing tube, a dropping funnel and a stirrer, and then stirred at room temperature under a nitrogen flow overnight to form an uniform solution (apart from the polyether sulfone copolymer, a polyether sulfone homopolymer is not sulfonated by concentrated sulfuric acid). To this solution, 48 ml of chlorosulfuric acid was added from the dropping funnel while stirring under a nitrogen flow. Since chlorosulfuric acid reacts vigorously with water in concentrated sulfuric acid to gas evolution for a while after the initiation of the dropwise addition, chlorosulfuric acid was slowly added dropwise. After the gas evolution becomes mild, the dropwise addition was terminated within 5 minutes. The reaction solution obtained after the completion of the dropwise addition was stirred at 35° C. for 5 hours to sulfonate the polyether sulfone. The sulfonated polyether sulfone was precipitated by slowly adding the reaction solution to 3 liter of deionized water, filtered and then recovered. A deionized water-washing operation using a mixer and a recovering operation using a suction filter were repeated until the wash becomes neutral, and then the polymer was dried under reduced pressure at 80° C. overnight. The ion-exchange group equivalent weight of the resulting sulfonated polyether sulfone was 720 g/mol.

(2) Evaluation of fuel cell

According to the method described in Example 1 (3), a film of the sulfonated polyether sulfone obtained in the above item (1) was formed. According to the same manner as that described in Example 1 (3), a trial of bonding an electrode was made, but the resulting film was completely dissolved in boiling water during a boiling water treatment. As seen from these results, the film of Example 1 has higher water resistance than that of Comparative Example 3 regardless of the introduction amount of sulfonic acid groups of Example 1 is larger than that of the Comparative Example 3. The film of Example 1 is more preferable as the polymer electrolyte for fuel cell.

As described above, according to the present invention, there can be provided a polymer electrolyte for fuel cell, which is cheap and easily synthesized and which has high water resistance and high output performance, a method for producing the same, and a fuel cell using the polymer electrolyte.

We claim:

1. A polymer electrolyte for a fuel cell, comprising:

a sulfonated polymer having an ion-exchange group equivalent weight of 500 to 2500 g/mol, which is obtainable by sulfonating a structural unit represented by the structural formula (II) of a copolymer having 95 to 40 mol % of a structural unit represented by the following structural formula (I) and 5 to 60 mol % of a structural unit represented by the following structural formula (II),

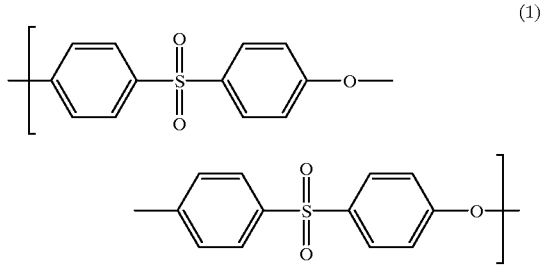

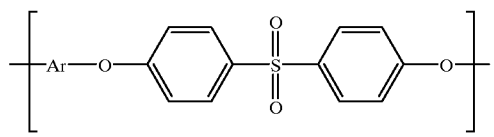

wherein Ar represents at least one of the following structures,

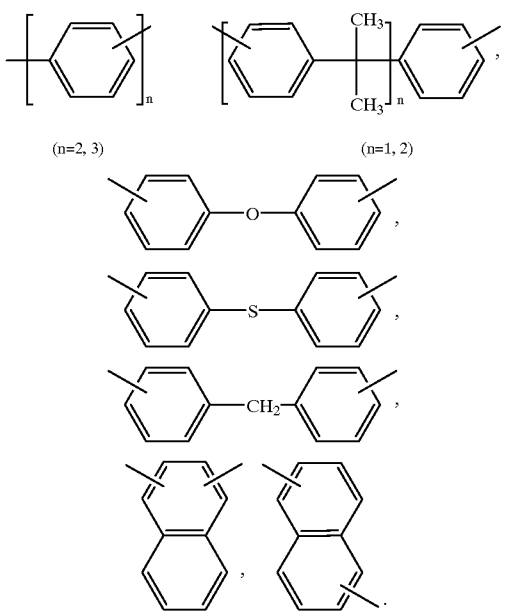

2. The polymer electrolyte for a fuel cell according to claim 1, wherein the sulfonated polymer has ion-exchange groups with an equivalent weight of 500 to 1500 g/mol.

3. The polymer electrolyte for a fuel cell according to claim 1, wherein Ar represents the following structure,

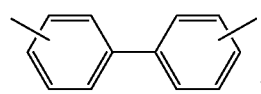

4. The polymer electrolyte for a fuel cell according to claim 1, wherein the polymer electrolyte is obtained by controlling a copolymerization ratio of the structural formula (II) to the structural formula (I).

5. A polymer electrolyte membrane for a fuel cell, wherein the membrane comprises a polymer electrolyte for fuel cell, comprising:

a sulfonated polymer having an ion-exchange group equivalent weight of 500 to 2500 g/mol, which is obtainable by sulfonating a structural unit represented by the structural formula (II) of a copolymer having 95 to 40 mol % of a structural unit represented by the following structural formula (I) and 5 to 60 mol % of a structural unit represented by the following structural formula (II),

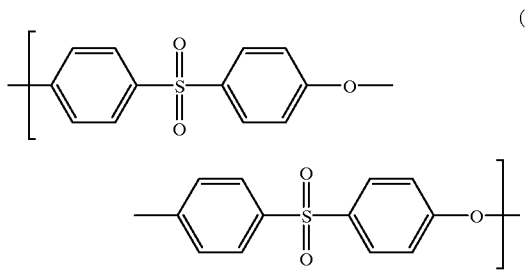
(1)

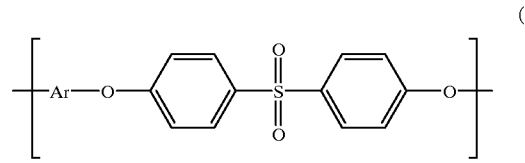
(II)

wherein Ar represents at least one of the following structures,

(n=2, 3)    (n=1, 2)

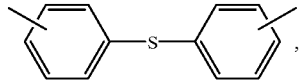,

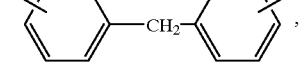,

,

, .

6. A method for producing a polymer electrolyte membrane for a fuel cell, which comprises:

forming a membrane of a polymer electrolyte for the fuel cell, comprising:
a sulfonated polymer having an ion-exchange group equivalent weight of 500 to 2500 g/mol, which is obtainable by sulfonating a structural unit represented by the structural formula (II) of a copolymer having 95 to 40 mol % of a structural unit represented by the following structural formula (I) and 5 to 60 mol % of a structural unit represented by the following structural formula (II),

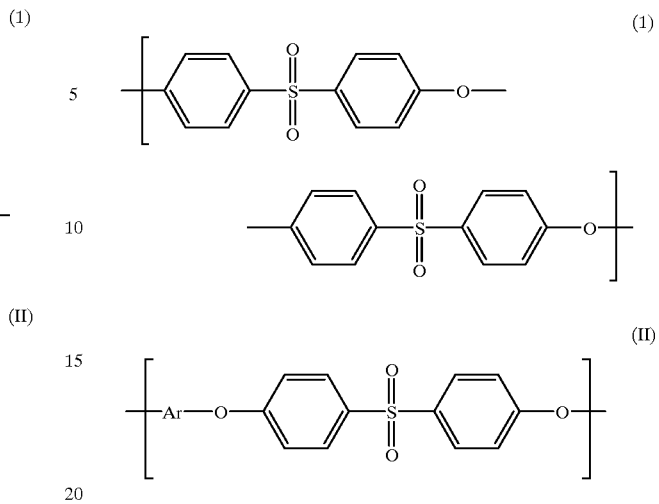
(1)

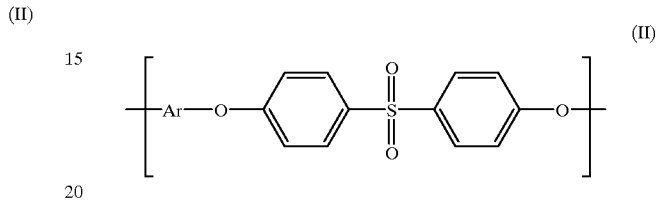
(II)

wherein Ar represents at least one of the following structures,

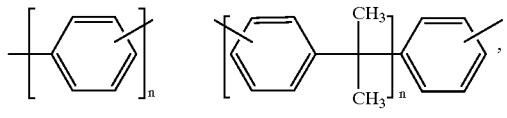

(n=2, 3)    (n=1, 2)

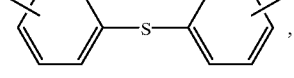,

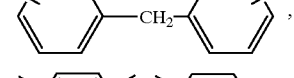,

,

, 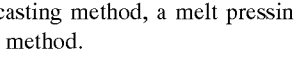.

by a solution casting method, a melt pressing method or a melt extrusion method.

7. A fuel cell comprising a polymer electrolyte, comprising:

a sulfonated polymer having an ion-exchange group equivalent weight of 500 to 2500 g/mol, which is obtainable by sulfonating a structural unit represented by the structural formula (II) of a copolymer having 95 to 40 mol % of a structural unit represented by the following structural formula (I) and 5 to 60 mol % of a structural unit represented by the following structural formula (II),

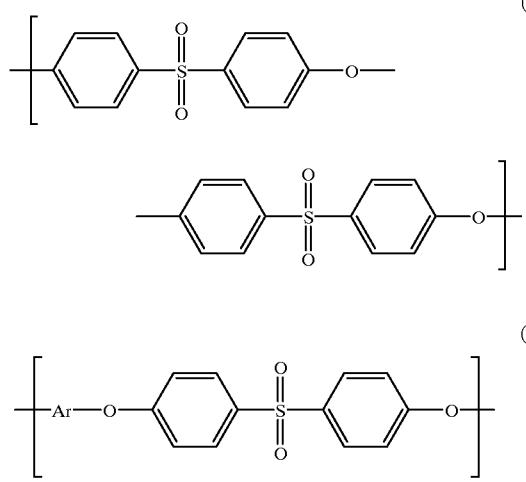
wherein Ar represents at least one of the following structures,
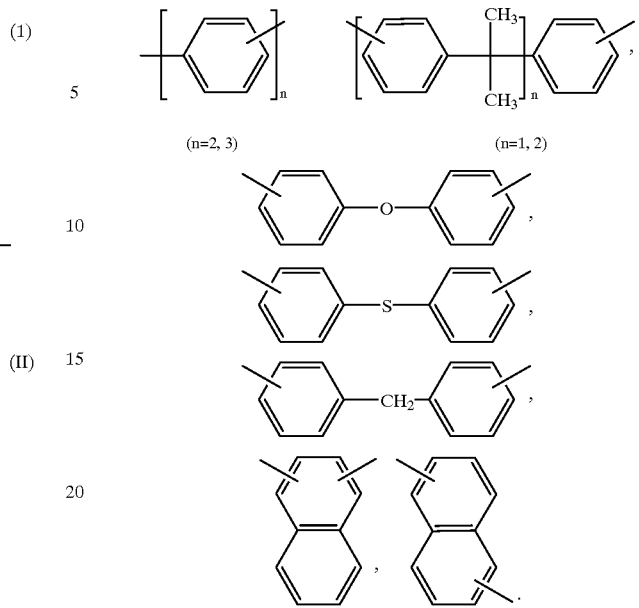
* * * * *